United States Patent [19]

Smith et al.

[11] Patent Number: 5,081,836

[45] Date of Patent: Jan. 21, 1992

[54] OXYGEN SUPPLY SYSTEM FOR A REGENERABLE PARTICULATE FILTER ASSEMBLY OF A DIESEL ENGINE

[75] Inventors: Aaron L. Smith, East Peoria; Mark E. Feldman, Edelstein, both of Ill.

[73] Assignee: Caterpillar Inc., Peoria, Ill.

[21] Appl. No.: 633,564

[22] Filed: Dec. 24, 1990

[51] Int. Cl.$^5$ .......................... F02B 37/00; F01N 3/02
[52] U.S. Cl. ........................ 60/280; 60/303; 60/606
[58] Field of Search .......................... 60/280, 303, 606

[56] References Cited

U.S. PATENT DOCUMENTS

| | | | |
|---|---|---|---|
| 4,112,684 | 9/1978 | Tholen | 60/606 |
| 4,449,370 | 5/1984 | Ream | 60/606 |
| 4,506,505 | 3/1985 | Melzer | 60/278 |
| 4,520,624 | 6/1985 | Kiyota et al. | 60/286 |
| 4,571,938 | 2/1986 | Sakurai | 60/303 |
| 4,677,823 | 7/1987 | Hardy | 60/274 |
| 4,936,093 | 6/1990 | Goerlich | 60/280 |

FOREIGN PATENT DOCUMENTS 588160  12/1959  Canada.

OTHER PUBLICATIONS

Portion of installation instructions and operating instructions of a Soot Converter RC50-150 by Webasto AG Fahrzeugtechnik, Federal Republic of Germany, published circa Apr. 1990.

*Primary Examiner*—Douglas Hart
*Attorney, Agent, or Firm*—Charles E. Lanchantin, Jr.

[57] ABSTRACT

Heretofore, auxiliary air was directed to a particulate filter assembly of a supercharged diesel engine for proper regeneration thereof by a relatively large auxiliary air compressor, or alternatively from a take-off duct communicating with the inlet manifold of the diesel engine. The former solution often requires a governed compressor for improved efficiency and is expensive, and the latter does not provide satisfactory regeneration throughout the full operating range of the engine. These problems are overcome by providing an oxygen supply system for a diesel engine having an inlet manifold, an exhaust manifold, a supercharger, a first passage device for communicating pressurized air from the supercharger to the inlet manifold, a second passage device including a particulate filter assembly for communicating exhaust gas from the supercharger to the atmosphere, and a third passage device including an auxiliary pump mechanism having a relatively small air pump that provides sufficient oxygen solely from the first passage device to assure proper regeneration under all normal engine operating conditions.

11 Claims, 2 Drawing Sheets

OXYGEN SUPPLY SYSTEM FOR A REGENERABLE PARTICULATE FILTER ASSEMBLY OF A DIESEL ENGINE

DESCRIPTION

1. Technical Field

This invention relates generally to a diesel engine equipped with a supercharger and a particulate filter for reducing the amount of deleterious material exhausted to the atmosphere, and more particularly to an oxygen supply system for better regenerating the particulate filter.

2. Background Art

In order to overcome a lack of sufficient oxygen to a catalytic combustion system and to a particulate trap regeneration system respectively, U.S. Pat. No. 4,449,370 issued to L. W. Ream on May 22, 1984 and U.S. Pat. No. 4,677,823 issued to J. A. Hardy on July 7, 1987 teach the use of an auxiliary air supply source for supplementing the oxygen level present in the exhaust gas emanating from the engine and for efficient operation of the fuel burner unit. These auxiliary sources incorporate a relatively large air compressor or air pump that is typically electrically driven. Since the flow rate of the auxiliary air compressor must be large enough to sustain a flame in the burner unit at full throttle, high flow rate conditions, the air compressor would supply too much air at low flow conditions unless an expensive governed compressor is used.

U.S. Pat. No. 4,936,093 issued to D. Goerlich on June 26, 1990 recognized the cost aspects of initially purchasing and thereafter operating a large air pump for providing enough oxygen to properly regenerate a soot filter associated with a diesel engine. That patent proposed tapping off a portion of the pressurized air from a supercharged inlet manifold to supplement the oxygen level present in the exhaust gas ducting. In this way the costs of a separate large air pump system could be avoided.

However, it has been found that in some high output diesel engines equipped with a conventional turbocharger tapping off a portion of the compressed air in the inlet manifold is not sufficient for supporting regeneration of the filter across the full operating range of the engine. Specifically, the amount of pressurized air delivered to the fuel burner was not enough to reliably sustain operation of the flame during many part load and part throttle conditions of engine operation using the system of aforementioned U. S. Pat. No. 4,936,093.

Thus, what is needed is a reliable, efficient, and low cost auxiliary oxygen supply system for regenerating a particulate filter assembly of a non naturally-aspirated diesel engine that will function effectively across the full range of operating conditions thereof. Particularly, the supply system should function efficiently throughout the full range of engine operating conditions that are typically encountered on a ground based vehicle, such as an on highway truck or the like.

The present invention is directed to overcoming one or more of the problems as set forth above.

DISCLOSURE OF THE INVENTION

A diesel engine includes an inlet manifold, an exhaust manifold, a supercharger, first passage means for communicating pressurized air from the supercharger to the inlet manifold, and second passage means for communicating exhaust gas from the supercharger to the atmosphere and including a particulate filter assembly. In one aspect of the invention an oxygen supply system is provided therefore including third passage means for controllably communicating a portion of the pressurized air in the first passage means to the filter assembly, and auxiliary pump means for aiding in the delivery of air through the third passage means from the first passage means and assuring sufficient oxygen to sustain regeneration of the filter assembly under the full range of operating conditions of the engine.

The oxygen supply system of the present invention provides additional air from the pressurized or supercharged first passage means to assure that efficient regeneration of the particulate filter unit or particulate trap can be carried out for the full operating range of the diesel engine.

BEST MODE FOR CARRYING OUT THE INVENTION

Figure 1:
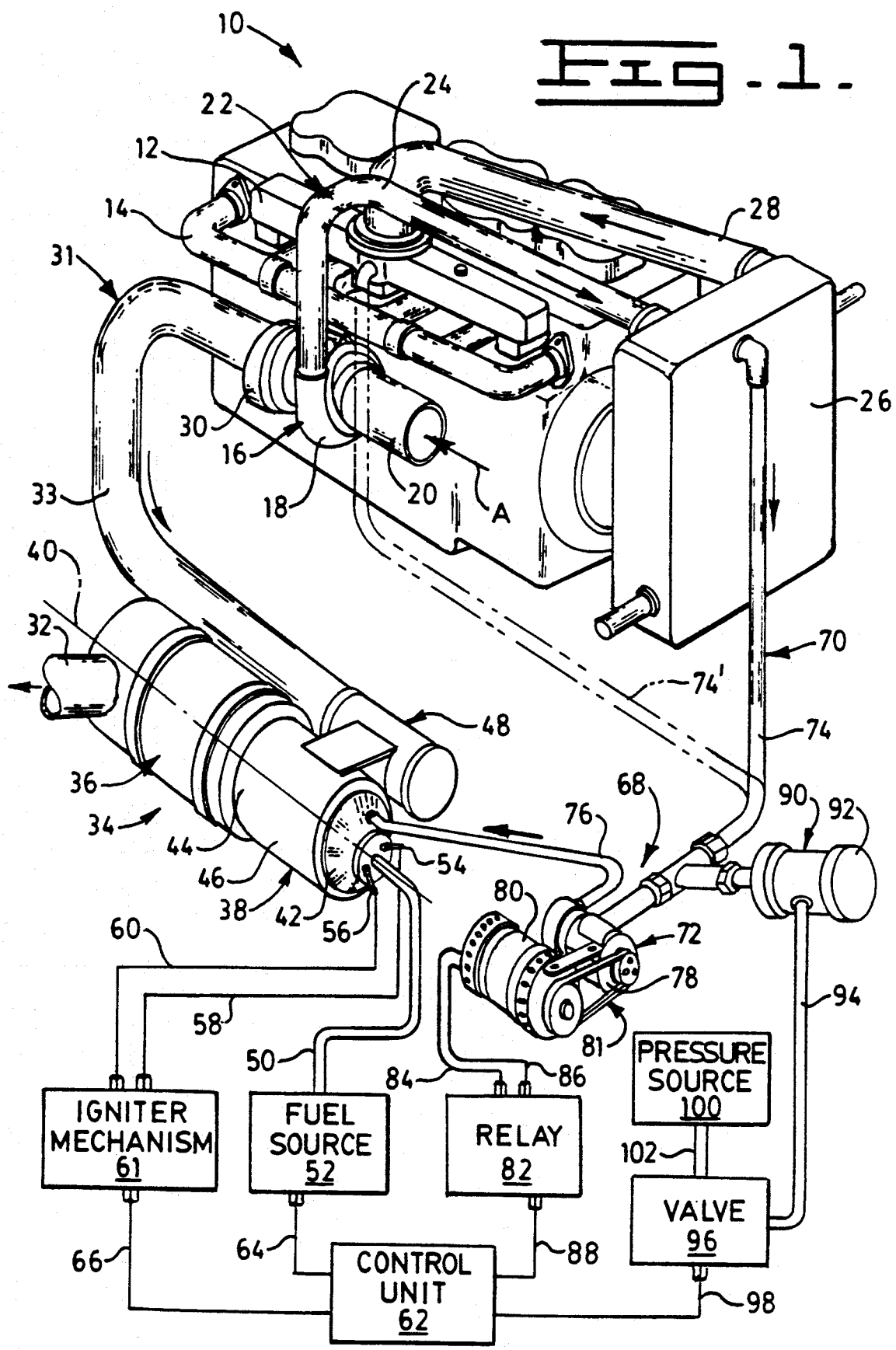
FIG. 1 is a diagrammatic pictorial view of a diesel engine, a regenerable particulate filter assembly, and an oxygen supply system therefore constructed in accordance with the present invention.

A high output internal combustion engine 10 is diagrammatically shown in FIG. 1. In the instant example the engine is a 6 cylinder diesel engine rated at approximately 325 horsepower at 1800 rpm. The diesel engine 10 has an inlet manifold 12, an exhaust manifold 14, and a supercharger 16. The present invention is applicable solely to non naturally aspirated engines, and the term "supercharger" as used herein is meant to broadly cover a turbocharger, Roots-type positive displacement blower, pressure wave machine, or similar conventional pumping devices that compress the air delivered to the engine's inlet manifold. The supercharger 16 is preferably a conventional turbocharger having a compressor portion 18 adapted to receive filtered air as is indicated by the flow indicating arrow A at ambient temperature through an inlet pipe 20. A first passage means or device 22 delivers the pressurized air from the compressor portion 18 to the inlet manifold 12. In this embodiment the first passage means 22 includes a first duct 24 leading from the compressor portion 18 to a water-cooled or air-cooled heat exchanger 26, and a second duct 28 leading from the heat exchanger to the inlet manifold 12.

The turbocharger 16 also has a turbine portion 30 adapted to receive the exhaust gas from the exhaust manifold 14 and to exhaust the gas through a second passage means or device 31 to the atmosphere via an exhaust pipe 32. The second passage means 31 includes a third duct 33 and a regenerable particulate filter assembly 34 serially connected thereto. The filter assembly includes a cylindrical filter unit 36 and an upstream fuel burner unit 38 serially coupled thereto and arranged along a common axis 40 therewith. The burner unit 38 includes a conically shaped inlet end 42, an outlet end 44, and an intermediate tubular portion 46 therebetween. An appropriately shaped coupling plenum 48 is connected to the intermediate tubular portion 46 for better directing the particle laden exhaust gas from the third duct 33 to the burner unit 38. Associated with the inlet end 42 of the burner unit 38 is a fuel injection nozzle, arranged internally along the axis 40 and not shown, which is connected to an external fuel conduit 50 leading to a controlled source 52 of pressurized and metered fuel. A pair of ignition electrodes or spark plugs 54 and 56 are also connected to the inlet end 42 of the fuel burner unit 38, and a pair of electrical lines 58 and 60 lead away therefrom to an igniter mechanism 61. A control unit 62, preferably containing a microprocessor although not shown, is electrically connected to the fuel source 52 and to the igniter mechanism 61 by electrical lines 64 and 66 respectively.

Advantageously, an oxygen supply system 68 is provided for regeneration of the particulate filter assembly 34 that supplements the amount of oxygen in the exhaust gas delivered through the third duct 33. Such auxiliary oxygen supply system includes a third passage means or device 70 for controllably communicating a portion of the pressurized air from the first passage means 22 to the particulate filter assembly 34, and an auxiliary pump mechanism or means 72 for aiding in the delivery of sufficient oxygen in the third passage means 70 to sustain effective combustion within the burner unit 38 through the full operating range of the diesel engine 10. More particularly, the third passage means 70 includes a fourth duct or take-off duct 74 leading, in the instant embodiment, cooled pressurized air from the heat exchanger 26 to the auxiliary pump means 72, and a fifth duct 76 leading away from the auxiliary pump means and to the inlet end 42 of the burner unit 38.

The auxiliary pump means 72 includes a conventional air pump or air compressor 78, such as a rotary vane type air compressor manufactured by Nippondenso Co., Ltd of Japan. Preferably, the air pump 78 is driven by an electric motor 80 through a belt drive device 81 as is known in the art. The electric motor 80 is connected to a relay 82 via a pair of electric lines 84 and 86, and the relay is controllably operated by the control unit 62 through a line 88 extending therebetween.

The third passage means 70 also includes a valve mechanism or valve means 90 for closing off the take-off duct 74 when regeneration of the particulate filter assembly 34 is not desired. Such valve means 90 includes a conventional gas or fluid-operated piston assembly 92 connected to and operated by a pressurizable conduit 94 leading to a solenoid operated valve 96. The valve 96 is actuated via an electric line 98 connected to the control unit 62, and is connected to a source of pressurized gas or fluid 100 via a conduit 102.

INDUSTRIAL APPLICABILITY

In operation, the compressor portion 18 of the turbocharger 16 communicates ambient air from the inlet pipe 20 to the heat exchanger 26 via the first duct 24 at a pressure level and temperature level above that ambient value. The heat exchanger in the instant example is water-cooled in any conventional manner, although it could alternatively be air-cooled by a conventional engine-driven fan system, in order to lower the temperature and thus the density of the compressed air being directed through the second duct 28 to the inlet manifold 12. The exhaust gas in the exhaust manifold 14 is simultaneously directed to the turbine portion 30 of the turbocharger 16, and energy therefrom is utilized to mechanically drive the compressor portion 18 in the usual way. Thereafter, the particle laden exhaust gas is directed from the turbine portion 30 through the third duct 33 to the particulate filter assembly 34. The particulate filter assembly 34 removes 90% or more of the soot in the exhaust gas before directing the relatively clean gas to the atmosphere through the exhaust pipe 32. These particulate filter assemblies can be, for example, of the type manufactured by Webasto AG Fahrzeugtechnik, of The Federal Republic of Germany, and therefore need not be more specifically described herein.

During normal operation of the diesel engine 10 the oxygen supply system 68 is not working because the third passage means 70 is blocked by the valve means 90. In other words, no air is directed from the first passage means 22 to the fuel burner 38 when not regenerating. However, when the particulate filter unit 36 accumulates a preselected quantity of soot the control unit 62 responds thereto in any conventional manner to initiate a regeneration cycle. In this regard, the control unit 62 is preferably connected to a pair of conventional pressure transducers individually disposed at each end of the filter unit 36, and to a temperature transducer at the burner unit 38, although they are not shown in FIG. 1.

Assuming a regeneration cycle is initiated by the control unit 62, the solenoid operated or magnetic valve 96 is opened to connect the pressurized gas or fluid source 100 and conduit 102 to the control conduit 94 leading to the piston assembly 92. This opens the valve means 90 and allows flow of pressurized air from the first passage means 22 through the fourth duct 74 to the air pump 78. The control unit 62 simultaneously operates the relay 82 via the control line 88, and this starts the electric motor 80 via the lines 86 and 88. Operation of the motor 80 drives the belt drive device 81 and thereby drives the air pump 78. Accordingly, supplemental oxygen is directed to the inlet end 42 of the burner unit 38 by way of the fifth duct 76. The control unit 62 also communicates the fuel source 52 and the conduit 50 therefrom to the inlet end 42 of the fuel burner unit 38, and temporarily activates the igniter mechanism 60 to cause the spark plugs 54 and 56 to initially ignite the fuel and to initiate a controlled combustion process within the fuel burner unit. The combustion process is continued within the fuel burner unit so that with the exhaust gas entering the coupling plenum 48 a gas temperature of approximately 1,300° F. (700° C.) is reached at the entrance of the filter unit 36. Irrespective of the operating conditions of the diesel engine 10 this is sufficient to reliably ignite and burn the soot particles caught within the surfaces of the filter unit 36. After a preselected period of time the additional heat provided by the burning fuel is no longer needed because the particulates trapped within the filter unit 36 are then burning in a self-sustaining manner, and the control unit 62 automatically shuts off the fuel source 52. After approximately 5 to 10 minutes the majority of soot trapped in the filter unit is burned away and the regeneration process is completed, and the control unit 62 shuts off the electric motor 80 driving the air pump 78 and closes the valve means 90.

Figure 2:
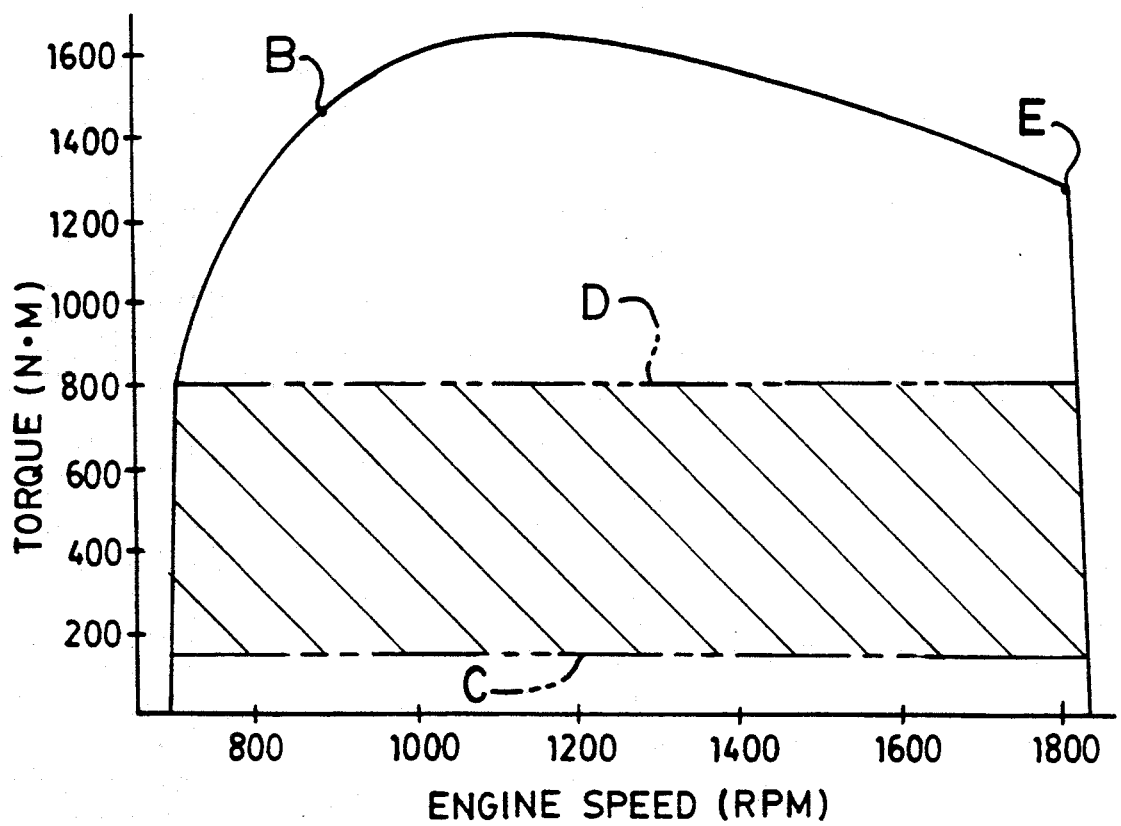
FIG. 2 is a performance chart of a representative diesel engine setting forth the normal operating speed range on the abscissa, the engine load or torque level on the ordinate, and the lug curve therefore.

A prior art diesel engine having the soot-filtering unit of previously mentioned U. S. Pat. No. 4,936,093 was evaluated wherein pressurized air was drawn from the inlet manifold and delivered to the inlet end of the fuel burner unit. Referring to FIG. 2, it was determined that throughout the engine speed range between a lower torque limit of approximately 150 newton-meters (N·m) as shown by the line labeled C, and an upper torque limit of approximately 800 N·m as shown by line D, the particulate filter assembly could not be satisfactorily regenerated due to an inability of the fuel burner unit to sustain a flame and/or to reach a sustainable soot burning temperature. Thus, the system of previously mentioned U.S. Pat. No. 4,936,093 was determined to be inadequate for the intermediate range shown by the crosshatched lines, although it was satisfactory above and below that intermediate range within the lug curve B.

However, when the oxygen supply system 68 of FIG. 1 was operated, including use of the auxiliary pump means 72 of the present invention, regeneration of the filter assembly 34 proved to be adequate throughout the full engine operating range. At low loads or boost levels the relatively small air pump 78 provided enough auxiliary oxygen at a minimum flow rate of approximately 23 cubic feet per minute (CFM) through the ducts 74 and 76 to the fuel burner unit 38. At high loads the compressor portion 18 provides additional boost or pressure in the first passage means 22 and this increased the flow rate through the air pump to the burner unit. At point E on the lug curve B of FIG. 2, the air flow rate into the inlet manifold 12 was approximately 630 CFM, while an air flow rate of approximately 47 CFM was being communicated to the burner unit 38. This means that less than approximately 8% of the total available flow supplied by the compressor portion 18 to the first passage means 22 is delivered to the burner unit 38.

It is contemplated that the oxygen supply system 68 of the present invention will perform satisfactorily with several alternative forms of superchargers 16 as mentioned heretofore. For example, although not illustrated, a belt or gear driven Roots-type positive displacement blower could be used to pressurize the inlet air delivered to the first passage means 22. Alternatively, the first passage means 22 could be pressurized by a pressure exchanger such as the so-called Aero-Dynamic Pressure Wave Machine developed by Brown-Boveri & Company, Ltd, of Baden, Switzerland.

Furthermore, while the fourth duct 74 is shown in FIG. 1 as being connected to the first passage means 22 at the heat exchanger 26, it is apparent that in other instances the fourth duct could be connected directly to the inlet manifold 12 as is indicated by the phantom lines identified by the reference number 74'.

Other aspects, objects and advantages of this invention can be obtained from a study of the drawings, the disclosure and the appended claims.

We claim:

1. An oxygen supply system for use with an internal combustion engine having an inlet manifold, an exhaust manifold, a supercharger, first passage means for communicating pressurized air from the supercharger to the inlet manifold, and second passage means for communicating exhaust gas from the supercharger to the atmosphere including a particulate filter assembly, comprising:

third passage means for controllably communicating a portion of the pressurized air from the first passage means to the particulate filter assembly; and auxiliary pump means for aiding in the delivery of a volumetric rate of pressurized air through the third passage means solely from the first passage means and assuring with the exhaust gas in the second passage means sufficient oxygen to sustain regeneration of the particulate filter assembly through the full range of operating conditions of the engine.

2. The oxygen supply system of claim 1 wherein the internal combustion engine is a diesel engine and the supercharger is a conventional turbocharger having a compressor portion and a turbine portion.

3. The oxygen supply system of claim 1 wherein the internal combustion engine is a diesel engine and the supercharger is a pressure exchanger of the type known as an Aero-Dynamic Pressure Wave Machine.

4. The oxygen supply system of claim 1 wherein the internal combustion engine is a diesel engine and the supercharger is a mechanically driven blower that delivers compressed air to the inlet manifold.

5. The oxygen supply system of claim 1 wherein the particulate filter assembly includes a filter unit and a burner unit disposed in an upstream serial relationship with the filter unit, and wherein the second and third passage means are connected to the burner unit.

6. The oxygen supply system of claim 5 wherein the third passage means includes a take-off duct and valve means for closing off the take-off duct when regeneration of the particulate filter assembly is not desired.

7. The oxygen supply system of claim 6 wherein the auxiliary pump means includes an air pump connected to the take-off duct and a control unit for controllably operating the air pump and opening the valve means when regeneration of the particulate filter assembly is desired.

8. The oxygen supply system of claim 7 wherein the auxiliary pump means includes an electric motor and means for drivingly connecting the electric motor to the air pump.

9. The oxygen supply system of claim 8 wherein the auxiliary pump means includes a relay and means for electrically connecting the control unit, the relay, and the electric motor.

10. The oxygen supply system of claim 6 wherein the first passage means includes a heat exchanger for cooling the air delivered from the supercharger to the inlet manifold.

11. An oxygen supply system for use with a diesel engine including a turbocharger having a compressor portion and a turbine portion, an air inlet passage pressurized by the compressor portion, an exhaust gas passage leading to the turbine portion, and an exhaust duct leading away from the turbine portion, comprising:

a particulate filter assembly including a fuel burner unit connected to the exhaust duct, and a filter unit in serial communication with the fuel burner unit; and auxiliary means for controllably communicating a portion of the pressurized air solely from the air inlet passage to the fuel burner unit, the auxiliary means including an auxiliary air pump and means for positively driving the air pump so that sufficient oxygen is provided for effective operation of the fuel burner unit throughout the full speed and load range of the diesel engine.

* * * * *